(12) United States Patent  
Chen et al.

(10) Patent No.: US 10,382,237 B2  
(45) Date of Patent: Aug. 13, 2019

(54) METHOD AND APPARATUS FOR PROCESSING DATA OF MULTIPLE RATES

(71) Applicant: Huawei Technologies Co., Ltd., Shenzhen (CN)

(72) Inventors: Guodao Chen, Shenzhen (CN); Chunrong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/018,982

(22) Filed: Jun. 26, 2018

(65) Prior Publication Data

US 2018/0309603 A1    Oct. 25, 2018

Related U.S. Application Data

(63) Continuation of application No. PCT/CN2016/108904, filed on Dec. 7, 2016.

(30) Foreign Application Priority Data

Dec. 26, 2015  (CN) .......................... 2015 1 1000383

(51) Int. Cl.  
*H04L 27/00* (2006.01)  
*H04B 10/2575* (2013.01)  
(Continued)

(52) U.S. Cl.  
CPC ... *H04L 27/0008* (2013.01); *H04B 10/25759* (2013.01); *H04B 10/40* (2013.01); *H04L 1/0005* (2013.01); *H04L 27/00* (2013.01)

(58) Field of Classification Search  
CPC ... H04L 27/0008; H04L 27/00; H04L 1/0005; H04B 10/40; H04B 10/25759  
See application file for complete search history.

(56) References Cited

U.S. PATENT DOCUMENTS 7,308,058 B2 * 12/2007 Zerbe .................... H04L 1/0003  
                                                                375/259  
10,063,341 B1 *  8/2018 Farjadrad ............. H04L 1/0002  
(Continued)

FOREIGN PATENT DOCUMENTS

CN        101471793 A     7/2009  
CN        102547491 A     7/2012  
(Continued)

OTHER PUBLICATIONS

Machine Translation and Abstract of Chinese Publication No. CN101471793, Jul. 1, 2009, 18 pages.  
(Continued)

*Primary Examiner* — Vineeta S Panwalkar  
(74) *Attorney, Agent, or Firm* — Conley Rose, P.C.

(57) ABSTRACT

A method and an apparatus for processing data of multiple rates, where the method includes receiving, by a data processing apparatus, first data whose transmission rate is a first rate and second data whose transmission rate is a second rate, obtaining, by the data processing apparatus, N1 pieces of third data and N2 pieces of fourth data according to the first data, obtaining, by the data processing apparatus, M1 pieces of fifth data and M2 pieces of sixth data according to the second data, obtaining, by the data processing apparatus, serial seventh data according to the N1 pieces of third data, the N2 pieces of fourth data, and a first modulation scheme, and obtaining, by the data processing apparatus, serial eighth data according to the M1 pieces of fifth data, the M2 pieces of sixth data, and a second modulation scheme.

20 Claims, 7 Drawing Sheets

(51) Int. Cl.
*H04L 1/00* (2006.01)
*H04B 10/40* (2013.01)

(56) References Cited

U.S. PATENT DOCUMENTS

| | | | |
|---|---|---|---|
| 2009/0154593 A1* | 6/2009 | Diab | H04L 47/10 |
| | | | 375/295 |
| 2012/0163820 A1 | 6/2012 | Dangui et al. | |
| 2013/0294774 A1 | 11/2013 | Songlin et al. | |
| 2014/0218206 A1 | 8/2014 | Tjhang et al. | |
| 2014/0286346 A1 | 9/2014 | Ghiasi | |
| 2016/0006535 A1 | 1/2016 | Fu et al. | |

FOREIGN PATENT DOCUMENTS

| | | |
|---|---|---|
| CN | 102780639 A | 11/2012 |
| CN | 103997388 A | 8/2014 |
| CN | 203761399 U | 8/2014 |

OTHER PUBLICATIONS

Machine Translation and Abstract of Chinese Publication No. CN102780639, Nov. 14, 2012, 17 pages.
Foreign Communication From a Counterpart Application, PCT Application No. PCT/CN2016/108904, English Translation of International Search Report dated Feb. 24, 2017, 2 pages.
Foreign Communication From a Counterpart Application, PCT Application No. PCT/CN2016/108904, English Translation of Written Opinion dated Feb. 24, 2017, 6 pages.
Foreign Communication From a Counterpart Application, European Application No. 16877583.1, Extended European Search Report dated Nov. 16, 2018, 9 pages.
Machine Translation and Abstract of Chinese Publication No. CN203761399, Aug. 6, 2014, 8 pages.
Foreign Communication From a Counterpart Application, Chinese Application No. 201511000383.3, Chinese Office Action dated Oct. 8, 2018, 3 pages.
Foreign Communication From a Counterpart Application, Chinese Application No. 201511000383.3, Chinese Search Report dated Sep. 25, 2018, 2 pages.

\* cited by examiner

METHOD AND APPARATUS FOR PROCESSING DATA OF MULTIPLE RATES

CROSS-REFERENCE TO RELATED APPLICATIONS

This application is a continuation of International Patent Application No. PCT/CN2016/108904 filed on Dec. 7, 2016, which claims priority to Chinese Patent Application No. 201511000383.3 filed on Dec. 26, 2015. The disclosures of the aforementioned applications are hereby incorporated by reference in their entireties.

TECHNICAL FIELD

This application relates to the communications field, and in particular, to a method and an apparatus for processing data of multiple rates.

BACKGROUND

Currently, a line card (LC) needs to be disposed in each of two network devices communicating with each other using a fiber. To-be-transmitted data is converted from an electrical signal into an optical signal of a particular transmission rate, and the optical signal is transmitted using an Ethernet optical interface supporting a particular transmission rate. For optical signals of different transmission rates, according to a transmission rate of an optical signal, an LC matching the transmission rate of the optical signal needs to be installed into network devices performing communication using a fiber. Consequently, development and maintenance costs are relatively high.

SUMMARY

This application provides a method and an apparatus for processing data of multiple rates such that signals of multiple transmission rates can be obtained without changing an LC, helping to reduce development and maintenance costs.

Technical solutions provided in embodiments of this application are as follows.

According to a first aspect, a method for processing data of multiple rates is provided, including receiving, by a data processing apparatus, first data and second data, where a transmission rate of the first data is a first rate, a transmission rate of the second data is a second rate, and the first rate is different from the second rate, obtaining, by the data processing apparatus, N1 pieces of third data and N2 pieces of fourth data according to the first rate and the first data, where N1 is an integer greater than or equal to 1, and N2 is an integer greater than or equal to 0, obtaining, by the data processing apparatus, M1 pieces of fifth data and M2 pieces of sixth data according to the second rate and the second data, where M1 is an integer greater than or equal to 1, and M2 is an integer greater than or equal to 0, obtaining, by the data processing apparatus, seventh data according to the N1 pieces of third data, the N2 pieces of fourth data, and a first modulation scheme, where the seventh data is serially transmitted data, and a transmission rate of the seventh data is the first rate, obtaining, by the data processing apparatus, eighth data according to the M1 pieces of fifth data, the M2 pieces of sixth data, and a second modulation scheme, where the eighth data is serially transmitted data, and a transmission rate of the eighth data is the second rate, and outputting, by the data processing apparatus, the seventh data and the eighth data.

In the method provided in the foregoing technical solution, the data processing apparatus can split the first data transmitted at the first rate into multiple pieces of data, for example, the N1 pieces of third data and the N2 pieces of fourth data, and modulate the multiple pieces of data to obtain the seventh data transmitted at the first rate. The data processing apparatus splits the second data transmitted at the second rate into the M1 pieces of fifth data and the M2 pieces of sixth data without changing hardware or an interface, and modulates the M1 pieces of fifth data and the M2 pieces of sixth data into the eighth data transmitted at the second rate. In this way, the data processing apparatus can obtain signals of multiple transmission rates without changing an LC, helping to reduce development and maintenance costs.

Optionally, if N1 is equal to 1, and N2 is equal to 0, obtaining, by the data processing apparatus, seventh data according to the N1 pieces of third data, the N2 pieces of fourth data, and a first modulation scheme includes setting, by the data processing apparatus, the third data as the seventh data, where the first modulation scheme is transparently transmitting the third data.

Optionally, if M1 is equal to 1, and M2 is equal to 0, the obtaining, by the data processing apparatus, eighth data according to the M1 pieces of fifth data, the M2 pieces of sixth data, and a second modulation scheme includes setting, by the data processing apparatus, the fifth data as the eighth data, where the second modulation scheme is transparently transmitting the fifth data.

Optionally, obtaining, by the data processing apparatus, seventh data according to the N1 pieces of third data, the N2 pieces of fourth data, and a first modulation scheme includes modulating, by the data processing apparatus, the N1 pieces of third data and the N2 pieces of fourth data into ninth data according to the first modulation scheme, where a rate of the ninth data is the first rate, and performing, by the data processing apparatus, optical-to-electrical conversion on the ninth data to obtain the seventh data, where the seventh data is an optical signal.

Optionally, obtaining, by the data processing apparatus, eighth data according to the M1 pieces of fifth data, the M2 pieces of sixth data, and a second modulation scheme includes modulating, by the data processing apparatus, the M1 pieces of fifth data and the M2 pieces of sixth data into tenth data according to the second modulation scheme, where a rate of the tenth data is the second rate, and performing, by the data processing apparatus, optical-to-electrical conversion on the tenth data to obtain the eighth data, where the eighth data is an optical signal.

By means of the optical-to-electrical conversion, the data processing apparatus may directly input the seventh data and the eighth data into an optical interface such that the seventh data and the eighth data are transmitted using a fiber.

Optionally, in an example, the data processing apparatus determines the first rate according to a port for receiving the first data, and determines the second rate according to a port for receiving the second data, where the port for receiving the first data corresponds to the first rate, and the port for receiving the second data corresponds to the second rate.

The data processing apparatus receives the first data and the second data of different rates respectively using different ports such that the data processing apparatus may directly determine the first rate of the first data and the second rate of the second data according to port information when receiving data, helping to reduce an implementation difficulty.

Optionally, in another example, the data processing apparatus determines the first rate according to a bandwidth needed for transmitting a first optical signal, where the first optical signal is a signal obtained after optical-to-electrical conversion is performed on the seventh data, and the data processing apparatus determines the second rate according to a bandwidth needed for transmitting a second optical signal, where the second optical signal is a signal obtained after optical-to-electrical conversion is performed on the eighth data.

The data processing apparatus may pre-determine the first rate of the first data and the second rate of the second data according to bandwidth requirements of optical signals, and may pre-configure, in the data processing apparatus, an instruction used for processing the first data or the second data, helping to improve the processing efficiency of the data.

According to a second aspect, an apparatus for processing data of multiple rates is provided, where the apparatus includes a receiving unit, a first processing unit, a second processing unit, a first modulation unit, a second modulation unit, and an output unit, where the receiving unit is configured to receive first data and second data, where a transmission rate of the first data is a first rate, a transmission rate of the second data is a second rate, and the first rate is different from the second rate, the first processing unit is configured to obtain N1 pieces of third data and N2 pieces of fourth data according to the first data received by the receiving unit and the first rate, where N1 is an integer greater than or equal to 1, and N2 is an integer greater than or equal to 0, the second processing unit is configured to obtain M1 pieces of fifth data and M2 pieces of sixth data according to the second data received by the receiving unit and the second rate, where M1 is an integer greater than or equal to 1, and M2 is an integer greater than or equal to 0, the first modulation unit is configured to obtain seventh data according to the N1 pieces of third data and the N2 pieces of fourth data that are obtained by the first processing unit, and a first modulation scheme, where the seventh data is serially transmitted data, and a transmission rate of the seventh data is the first rate, the second modulation unit is configured to obtain eighth data according to the M1 pieces of fifth data and the M2 pieces of sixth data that are obtained by the second processing unit, and a second modulation scheme, where the eighth data is serially transmitted data, and a transmission rate of the eighth data is the second rate, and the output unit is configured to output the seventh data obtained by the first modulation unit and the eighth data obtained by the second modulation unit.

The data processing apparatus provided in the foregoing technical solution splits the first data transmitted at the first rate into multiple pieces of data, for example, the N1 pieces of third data and the N2 pieces of fourth data, and modulates the multiple pieces of data to obtain the seventh data transmitted at the first rate. The data processing apparatus splits the second data transmitted at the second rate into the M1 pieces of fifth data and the M2 pieces of sixth data without changing hardware or an interface, and modulates the M1 pieces of fifth data and the M2 pieces of sixth data into the eighth data transmitted at the second rate. In this way, the data processing apparatus can obtain signals of multiple transmission rates without changing an LC, helping to reduce development and maintenance costs.

Optionally, if N1 is equal to 1, and N2 is equal to 0, the first modulation unit is further configured to use the third data as the seventh data, where the first modulation scheme is transparently transmitting the third data.

Optionally, if M1 is equal to 1, and M2 is equal to 0, the second modulation unit is further configured to use the fifth data as the eighth data, where the second modulation scheme is transparently transmitting the fifth data.

Optionally, the first modulation unit is further configured to modulate the N1 pieces of third data and the N2 pieces of fourth data that are obtained by the first processing unit into ninth data according to the first modulation scheme, where a rate of the ninth data is the first rate, and perform optical-to-electrical conversion on the ninth data, to obtain the seventh data, where the seventh data is an optical signal.

Optionally, the second modulation unit is further configured to modulate the M1 pieces of fifth data and the M2 pieces of sixth data that are obtained by the second processing unit into tenth data according to the second modulation scheme, where a rate of the tenth data is the second rate, and perform optical-to-electrical conversion on the tenth data to obtain the eighth data, where the eighth data is an optical signal.

By means of the optical-to-electrical conversion, the data processing apparatus may directly input the seventh data and the eighth data into an optical interface such that the seventh data and the eighth data are transmitted using a fiber.

Optionally, in an example, the apparatus further includes a first determining unit configured to determine the first rate according to a port for receiving the first data, where the port for receiving the first data corresponds to the first rate, and a second determining unit configured to determine the second rate according to a port for receiving the second data, where the port for receiving the second data corresponds to the second rate.

The data processing apparatus receives the first data and the second data of different rates respectively using different ports such that the data processing apparatus may directly determine the first rate of the first data and the second rate of the second data according to port information when receiving data, helping to reduce an implementation difficulty.

Optionally, in another example, the apparatus further includes a first determining unit configured to determine the first rate according to a bandwidth needed for transmitting a first optical signal, where the first optical signal is a signal obtained after optical-to-electrical conversion is performed on the seventh data, and a second determining unit configured to determine the second rate according to a bandwidth needed for transmitting a second optical signal, where the second optical signal is a signal obtained after optical-to-electrical conversion is performed on the eighth data.

The data processing apparatus may pre-determine the first rate of the first data and the second rate of the second data according to bandwidth requirements of optical signals, and may pre-configure, in the data processing apparatus, an instruction used for processing the first data or the second data, helping to improve the processing efficiency of the data.

DESCRIPTION OF EMBODIMENTS

To make the objectives, technical solutions, and advantages of the embodiments of this application clearer, the following describes the technical solutions in the embodiments of this application with reference to the accompanying drawings in the embodiments of this application. The described embodiments are merely a part rather than all of the embodiments of this application.

Figure 1:
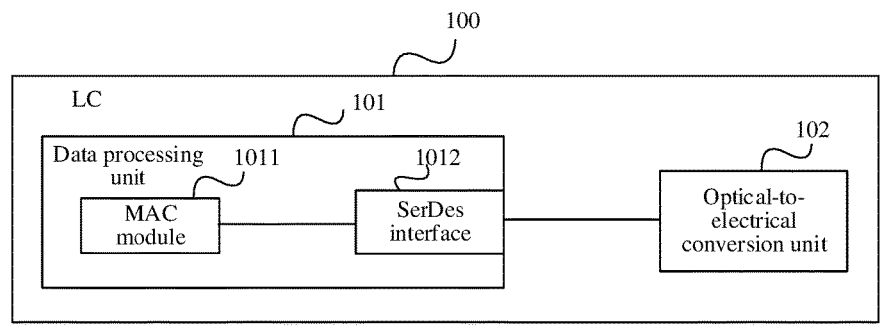
FIG. 1 is a schematic structural diagram of an LC.

As shown in FIG. 1, a general LC 100 includes a data processing unit 101 and an optical-to-electrical conversion unit 102. The data processing unit 101 includes a Media Access Control (MAC) module 1011, a serializer/deserializer (SerDes) interface 1012.

The MAC module 1011 receives one piece of parallelly transmitted data. The MAC module 1011 performs MAC encapsulation on the parallelly transmitted data to obtain encapsulated data. The MAC module 1011 outputs the encapsulated data to the SerDes interface 1012. The SerDes interface 1012 splits the received encapsulated data into N parallelly transmitted electrical signals. A transmission rate of the N electrical signals is a standard rate. The standard rate may be a transmission rate defined in an Ethernet standard. For example, the SerDes interface 1012 splits received 40 gigabits per second (Gbit/s) data into four pieces of 10 Gbit/s data, the SerDes interface 1012 splits received 100 Gbit/s data into four pieces of 25 Gbit/s data, the SerDes interface 1012 splits received 100 Gbit/s data into 10 pieces of 10 Gbit/s data, or the SerDes interface 1012 still transmits received 10 Gbit/s data at 10 Gbit/s. The SerDes interface 1012 outputs the N electrical signals to the optical-to-electrical conversion unit 102. The optical-to-electrical conversion unit 102 is configured to perform optical-to-electrical conversion on the N transmitted electrical signals to obtain N parallel optical signals. The optical-to-electrical conversion unit 102 may output the to-be-transmitted optical signals using a fiber connected to the optical-to-electrical conversion unit 102.

Using an example in which a transmission rate of one piece of parallelly transmitted data received by the MAC module 1011 is 10 Gbit/s, the SerDes interface 1012 converts, into one piece of serial data, one piece of parallel data encapsulated by the MAC module 1011. A transmission rate of the encapsulated one piece of parallel data is 10 Gbit/s. A transmission rate of the one piece of serial data is 10 Gbit/s. The SerDes interface 1012 outputs the one piece of serial data to the optical-to-electrical conversion unit 102. The optical-to-electrical conversion unit 102 may convert the one piece of serial data into an optical signal whose transmission rate is 10 Gbit/s, and output the optical signal using a fiber. The optical-to-electrical conversion module 102 may use a small form-factor pluggable plus (SFP+) optical module, and an input interface of the SFP+ optical module for receiving the electrical signal is a single-channel serial interface.

If a transmission rate of the one piece of parallelly transmitted data received by the MAC module 1011 is 40 Gbit/s, three SerDes interfaces 1012 in FIG. 1 need to be added to the processing unit 101. That is, the processing unit 101 includes the MAC module 1011 and four SerDes interfaces 1012. Each of the four SerDes interfaces 1012 outputs one piece of 10 Gbit/s data. Correspondingly, the optical-to-electrical conversion unit 102 is a quad SFP+ (QSFP+) optical module. The QSFP+ optical module performs optical-to-electrical conversion on the four pieces of 10 Gbit/s data output by the data processing unit 101, and outputs, using a fiber, optical signals obtained after optical-to-electrical conversion. In this way, corresponding hardware needs to be designed for the LC 100, for example, four SerDes interface 1012 and the QSFP+ optical module to support different transmission rates. The general LC can process only a specific transmission rate. Consequently, development and maintenance costs are relatively high.

In view of the foregoing problem, embodiments of this application provide a solution of a technical solution of obtaining signals of multiple transmission rates without changing an LC, helping to reduce development and maintenance costs. The solution includes receiving, by a data processing apparatus, first data and second data, where a transmission rate of the first data is a first rate, a transmission rate of the second data is a second rate, and the first rate is different from the second rate, obtaining, by the data processing apparatus, N1 pieces of third data and N2 pieces of fourth data according to the first rate and the first data, where N1 is an integer greater than or equal to 1, and N2 is an integer greater than or equal to 0, obtaining, by the data processing apparatus, M1 pieces of fifth data and M2 pieces of sixth data according to the second rate and the second data, where M1 is an integer greater than or equal to 1, and M2 is an integer greater than or equal to 0, obtaining, by the data processing apparatus, seventh data according to the N1 pieces of third data, the N2 pieces of fourth data, and a first modulation scheme, where the seventh data is serially transmitted data, and a transmission rate of the seventh data is the first rate, obtaining, by the data processing apparatus, eighth data according to the M1 pieces of fifth data, the M2 pieces of sixth data, and a second modulation scheme, where the eighth data is serially transmitted data, and a transmission rate of the eighth data is the second rate, and outputting, by the data processing apparatus, the seventh data and the eighth data.

The data processing apparatus in the embodiments of this application may be installed on a device such as a packet transport network (PTN) device, an optical transport network (OTN) device, a router using optical transmission, or a switch using optical transmission. For example, the data processing apparatus may be installed on an LC of the device.

Embodiment 1

Figure 2A:
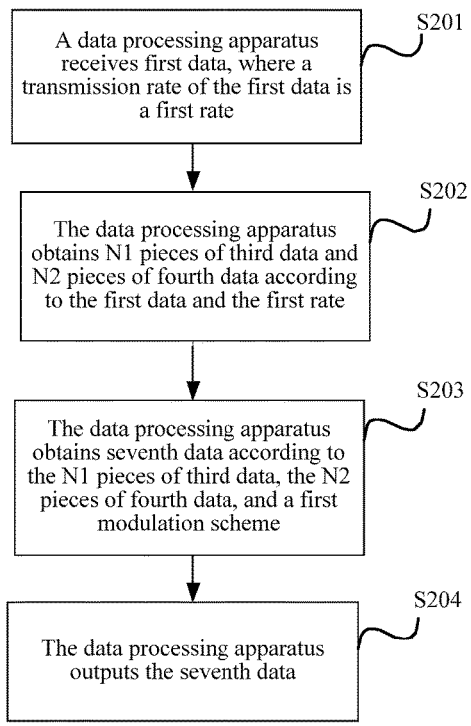
FIG. 2A is a flowchart of a method for processing data of multiple rates according to Embodiment 1 of this application.
Figure 2B:
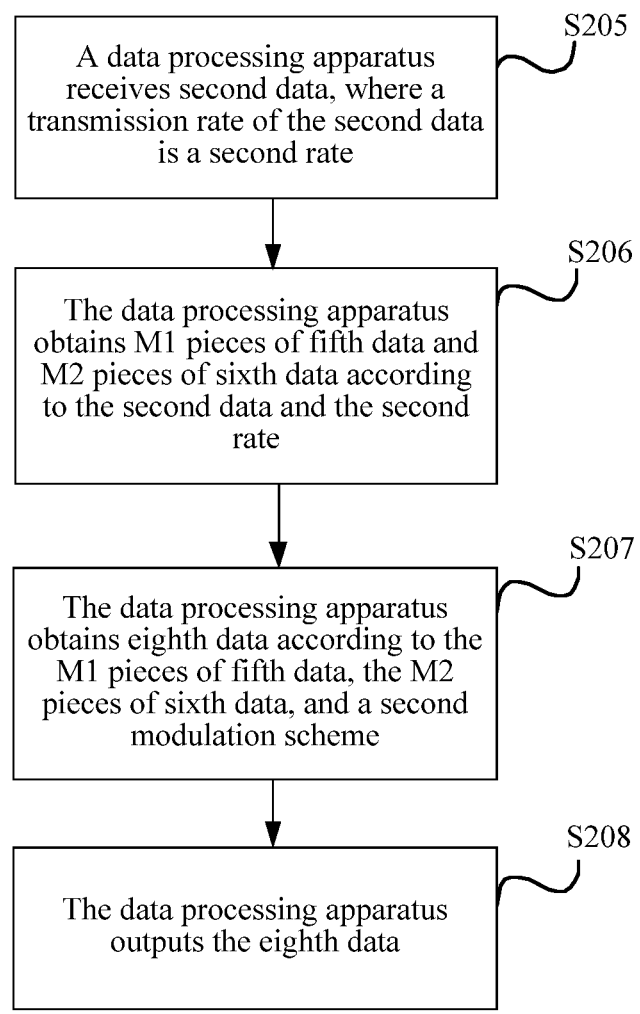
FIG. 2B is a flowchart of a method for processing data of multiple rates according to Embodiment 1 of this application.

FIG. 2A shows a process of processing, by a data processing apparatus, first data. FIG. 2B shows a process of processing, by a data processing apparatus, second data. The data processing apparatus may process the first data and the second data at the same time, or may process the first data and the second data in order. An order of processing the first data and the second data is not limited herein.

As shown in FIG. 2A, a method for processing data of multiple rates provided in Embodiment 1 of this application includes steps S201 to S204. As shown in FIG. 2B, the method for processing data of multiple rates provided in Embodiment 1 of this application includes steps S205 to S208.

Step S201. The data processing apparatus receives first data, where a transmission rate of the first data is a first rate.

Step S202. The data processing apparatus obtains N1 pieces of third data and N2 pieces of fourth data according to the first rate and the first data, where N1 is an integer greater than or equal to 1, and N2 is an integer greater than or equal to 0.

Step S203. The data processing apparatus obtains seventh data according to the N1 pieces of third data, the N2 pieces of fourth data, and a first modulation scheme, where the seventh data is serially transmitted data, and a transmission rate of the seventh data is the first rate.

Step S204. The data processing apparatus outputs the seventh data.

Step S205. The data processing apparatus receives second data, where a transmission rate of the second data is a second rate.

Step S206. The data processing apparatus obtains M1 pieces of fifth data and M2 pieces of sixth data according to the second rate and the second data, where M1 is an integer greater than or equal to 1, and M2 is an integer greater than or equal to 0.

Step S207. The data processing apparatus obtains eighth data according to the M1 pieces of fifth data, the M2 pieces of sixth data, and a second modulation scheme, where the eighth data is serially transmitted data, and a transmission rate of the eighth data is the second rate.

Step S208. The data processing apparatus outputs the eighth data.

In this embodiment of this application, "first" in the first data and "second" in the second data do not represent an order of the data, and "first" and "second" are used to indicate that the first data and the second data are different data. That is, step S201 may be performed before or after step S205, or step S201 and step S205 may be performed at the same time.

For example, the data processing apparatus may receive the first data and the second data at the same time, or may receive the first data and the second data chronologically. A port for receiving, by the data processing apparatus, the first data and a port for receiving, by the data processing apparatus, the second data may be a same port, or may be different ports. If the data processing apparatus receives the first data and the second data at the same time, the port for receiving, by the data processing apparatus, the first data and the port for receiving, by the data processing apparatus, the second data are different.

In a possible implementation, if the port for receiving, by the data processing apparatus, the first data and the port for receiving, by the data processing apparatus, the second data are different, the data processing apparatus may store a correspondence between a port and a rate. For example, a first correspondence includes the first rate and the port for receiving the first data, and a second correspondence includes the second rate and the port for receiving the second data.

Optionally, between steps S201 and S202, the method provided in Embodiment 1 of this application further includes determining, by the data processing apparatus, the first rate according to the port for receiving the first data. For example, the data processing apparatus may obtain the first rate according to the first correspondence and the port for receiving the first data.

Optionally, between steps S205 and S206, the method provided in Embodiment 1 of this application further includes determining, by the data processing apparatus, the second rate according to the port for receiving the second data. For example, the data processing apparatus may obtain the second rate according to the second correspondence and the port for receiving the second data.

For example, the data processing apparatus includes a first receiving port and a second receiving port, and a bus bandwidth of the first receiving port and a bus bandwidth of the second receiving port are different. The bus bandwidth of the first receiving port is 10 Gbit/s, and the bus bandwidth of the second receiving port is 40 Gbit/s. If the data processing apparatus receives the first data from the first receiving port, the data processing apparatus determines that the transmission rate of the first data is 10 Gbit/s. If the data processing apparatus receives the second data from the second receiving port, the data processing apparatus determines that the transmission rate of the second data is 40 Gbit/s.

In another possible implementation, because data received by the data processing apparatus needs to be transmitted using a fiber, the data processing apparatus may determine a rate of the received data according to a bandwidth needed by an optical signal transmitted using a fiber.

Optionally, the method provided in Embodiment 1 of this application further includes determining, by the data processing apparatus, the first rate according to a bandwidth needed for transmitting a first optical signal, where the first optical signal is an optical signal obtained after optical-to-electrical conversion is performed on the seventh data. The seventh data in Embodiment 1 of this application is an electrical signal. For example, the data processing apparatus may determine the first rate by reading the bandwidth needed by the first optical signal, before step S201, simultaneously with step S201, or after step S201 and before step S202. For example, the data processing apparatus determines the first rate by reading information that is stored in a register of a first optical-to-electrical conversion apparatus and that is about the bandwidth needed by the first optical signal. The first optical-to-electrical conversion apparatus is configured to perform optical-to-electrical conversion on the seventh data output by the data processing apparatus, to obtain the first optical signal.

Optionally, the method provided in Embodiment 1 of this application further includes determining, by the data processing apparatus, the second rate according to a bandwidth needed for transmitting a second optical signal, where the second optical signal is an optical signal obtained after optical-to-electrical conversion is performed on the eighth data. The eighth data in Embodiment 1 of this application is an electrical signal. For example, the data processing apparatus may determine the second rate by reading the bandwidth needed by the second optical signal, before step S205, simultaneously with step S205, or after step S205 and before step S206. For example, the data processing apparatus determines the second rate by reading information that is stored in a register of a second optical-to-electrical conversion apparatus and that is about the bandwidth needed by the second optical signal. The second optical-to-electrical conversion apparatus is configured to perform optical-to-electrical conversion on the eighth data output by the data processing apparatus, to obtain the second optical signal.

For example, step S202 includes, when the first data is N-bit parallelly transmitted data, splitting, by the data processing apparatus, the first data into the N1 pieces of third data and the N2 pieces of fourth data according to N1 and N2. A sum of N1 and N2 is less than or equal to N. The first data is the N-bit parallelly transmitted data.

For example, a transmission rate of the third data and a transmission rate of the fourth data are different. The N1 pieces of third data include different content. For example, if N1 is 2, N2 is 0, and the first data includes 16-bit data, one piece of third data in two pieces of third data includes the first 8 bits of the first data, and the other piece of third data in the two pieces of third data includes the last 8 bits of the first data. If N2 is greater than 0, the N2 pieces of fourth data include different content. This is not described herein using an example.

In step S206, a specific implementation of obtaining, by the data processing apparatus, the M1 pieces of fifth data and the M2 pieces of sixth data according to the second rate and the second data is the same as an implementation principle in step S202, and details are not described herein again. For example, a transmission rate of the fifth data and a transmission rate of the sixth data are different. The M1 pieces of fifth data include different content, and the M2 pieces of sixth data include different content. This is not described herein using an example.

In step S203, if N1 is equal to 1, and N2 is equal to 0, the obtaining, by the data processing apparatus, seventh data according to the N1 pieces of third data, the N2 pieces of fourth data, and a first modulation scheme includes setting, by the data processing apparatus, the third data as the seventh data, where the first modulation scheme is transparently transmitting the third data. For example, the data processing apparatus transparently transmits the third data as the seventh data, and does not change the transmission rate of the third data. Optionally, the data processing apparatus may perform line encoding processing such as forward error correction (FEC) on the third data, and use the third data after the encoding processing as the seventh data.

In step S203, if the sum of N1 and N2 is greater than or equal to 2, obtaining, by the data processing apparatus, seventh data according to the N1 pieces of third data, the N2 pieces of fourth data, and a first modulation scheme includes modulating, by the data processing apparatus, the N1 pieces of third data and the N2 pieces of fourth data, and combining the third data and the fourth data into one piece of serial data, where the one piece of serial data is the seventh data. The first modulation scheme may be multilevel pulse-amplitude modulation (multilevel PAM), discrete multi-tone modulation (DMT), direct detection faster than Nyquist modulation (DD-FTN), or the like. The modulation scheme is merely an example. The first modulation scheme provided in this embodiment of this application may be a modulation scheme of converting multiple signals into one signal. This is not described herein using an example.

For example, N1 is 2. That is, there are two pieces of third data. One piece of third data in the two pieces of third data may be referred to as a first piece of third data, and the other piece of third data in the two pieces of third data may be referred to as a second piece of third data. N2 is 3. That is, there are three pieces of fourth data. One piece of fourth data in the three pieces of fourth data may be referred to as a first piece of fourth data, another piece of fourth data in the three pieces of fourth data may be referred to as a second piece of fourth data, and the remaining one piece of fourth data in the three pieces of fourth data may be referred to as a third piece of fourth data.

The data processing apparatus modulates the first piece of third data and the second piece of third data into one piece of ninth data by means of pulse-amplitude-modulation with four amplitude levels (PAM-4). The first piece of third data and the second piece of third data may both use a low level representation 0, and the first piece of third data and the second piece of third data may both use a high level representation 1. The ninth data may use four different pulse amplitudes, respectively represented as 00, 01, 10, and 11. For the ninth data, two bits are transmitted within one clock cycle. An amplitude of the ninth data is a pulse amplitude corresponding to a bit value that includes one bit of the first piece of third data and one bit of the second piece of third data that are transmitted within one same clock cycle. For example, in a clock cycle, if a value of a transmitted bit of the first piece of third data is 0, and a value of a transmitted bit of the second piece of third data is 1, a bit value of two bits of the ninth data that are transmitted within the clock cycle is 01. An amplitude of the ninth data within the clock cycle is a pulse amplitude corresponding to the bit value, for example, 01.

The data processing apparatus modulates the first piece of fourth data, the second piece of fourth data, and the third piece of fourth data into one piece of tenth data by means of pulse-amplitude-modulation with eight amplitude levels (PAM-8). 000, 001, 010, 011, 100, 101, 110, and 111 of the tenth data are represented respectively using eight pulse amplitudes. For the tenth data, three bits are transmitted within one clock cycle. An amplitude of the tenth data is a pulse amplitude corresponding to a bit value that includes one bit of the first piece of fourth data, one bit of the second piece of fourth data, and one bit of the third piece of fourth data that are transmitted within one same clock cycle.

The data processing apparatus modulates the ninth data and the tenth data into one piece of seventh data. For example, the data processing apparatus modulates the ninth data and the tenth data into one piece of seventh data by increasing a clock frequency. One clock cycle of the seventh data includes a first sub clock cycle and a second sub clock cycle. Duration of the first sub clock cycle is a half of duration of the clock cycle of the ninth data, and duration of the second sub clock cycle is a half of the duration of the clock cycle of the tenth data. A bit transmitted within the first sub clock cycle is the same as a bit of the ninth data transmitted within the clock cycle, and a bit transmitted within the second sub clock cycle is the same as a bit of the tenth data transmitted within the clock cycle. Optionally, in a process of obtaining the seventh data using the N1 pieces of third data and the N2 pieces of fourth data, line encoding processing such as FEC may be performed on the third data and the fourth data, and the data that is modulated using the first modulation scheme and on which encoding processing is performed is used as the seventh data.

In step S207, if M1 is equal to 1, and M2 is equal to 0, the obtaining, by the data processing apparatus, eighth data according to the M1 pieces of fifth data, the M2 pieces of sixth data, and a second modulation scheme includes using, by the data processing apparatus, the fifth data as the eighth data, where the second modulation scheme is transparently transmitting the fifth data. For example, the data processing apparatus transparently transmits the fifth data as the eighth data, and does not change the transmission rate of the fifth data and a transmission manner of the fifth data.

Optionally, the data processing apparatus may perform line encoding processing such as FEC on the fifth data, and use the data after the encoding processing as the eighth data.

In step S207, if a sum of M1 and M2 is greater than or equal to 2, obtaining, by the data processing apparatus, eighth data according to the M1 pieces of fifth data, the M2 pieces of sixth data, and a second modulation scheme includes modulating, by the data processing apparatus, the M1 pieces of fifth data and the M2 pieces of sixth data, and combining the fifth data and the sixth data into one piece of serial data, where the one piece of serial data is the eighth data.

A specific implementation of the second modulation scheme is similar to a specific implementation of the first modulation scheme in step S203.

For example, M1 is 4. That is, there are four pieces of fifth data. One piece of fifth data in the four pieces of fifth data may be referred to as a first piece of fifth data, another piece of fifth data in the four pieces of fifth data may be referred to as a second piece of fifth data, another piece of fifth data in the four pieces of fifth data may be referred to as a third piece of fifth data, and the other piece of fifth data in the four pieces of fifth data may be referred to as a fourth piece of fifth data. M2 is 0.

The data processing apparatus modulates the first piece of fifth data and the second piece of fifth data into one piece of eleventh data by means of PAM-4. The first piece of fifth data and the second piece of fifth data may both use a low level representation 0, and the first piece of fifth data and the second piece of fifth data may both use a high level representation 1. The eleventh data may use four different pulse amplitudes, respectively represented as 00, 01, 10, and 11. For the eleventh data, two bits are transmitted within one clock cycle. An amplitude of the eleventh data is a pulse amplitude corresponding to a bit value that includes one bit of the first piece of fifth data and one bit of the second piece of fifth data that are transmitted within one same clock cycle. For example, within a clock cycle, if a value of a transmitted bit of the first piece of fifth data is 0, and a value of a transmitted bit of the second piece of fifth data is 1, a bit value of two bits of the eleventh data that are transmitted within the clock cycle is 01. Similarly, the data processing apparatus modulates the third piece of fifth data and the fourth piece of fifth data into one piece of twelfth data by means of PAM-4.

The data processing apparatus modulates the eleventh data and the twelfth data into one piece of eighth data. For example, the data processing apparatus modulates the eleventh data and the twelfth data into one piece of eighth data by increasing a clock frequency. One clock cycle of the eighth data includes a first sub clock cycle and a second sub clock cycle. Each of duration of the first sub clock cycle and duration of the second sub clock cycle is a half of duration of the clock cycle. A bit transmitted within the first sub clock cycle is the same as a bit of the eleventh data transmitted within the clock cycle, and a bit transmitted within the second sub clock cycle is the same as a bit of the twelfth data transmitted within the clock cycle.

Both the first modulation scheme in step S203 and the second modulation scheme in step S207 may be transparent transmission, or may be combining multiple pieces of data into one piece of data. Alternatively, the first modulation scheme may be transparent transmission, and the second modulation scheme may be combining multiple pieces of data into one piece of data.

The data processing apparatus outputs the seventh data in step S204. The seventh data is an electrical signal. For example, the data processing apparatus outputs the seventh data to the first optical-to-electrical conversion apparatus, the first optical-to-electrical conversion apparatus converts the seventh data into the first optical signal, and the first optical-to-electrical conversion apparatus outputs the first optical signal to a fiber for transmission.

The data processing apparatus outputs the eighth data in step S208. The eighth data is an electrical signal. For example, the data processing apparatus outputs the eighth data to a second optical-to-electrical conversion apparatus, the second optical-to-electrical conversion apparatus converts the seventh data into the second optical signal, and the second optical-to-electrical conversion apparatus outputs the second optical signal to a fiber for transmission.

In the method provided in this embodiment of this application, the data processing apparatus can split the first data transmitted at the first rate into multiple pieces of data, for example, the N1 pieces of third data and the N2 pieces of fourth data, and modulate the multiple pieces of data, to obtain the seventh data transmitted at the first rate. The data processing apparatus splits the second data transmitted at the second rate into the M1 pieces of fifth data and the M2 pieces of sixth data without changing hardware or an interface, and modulates the M1 pieces of fifth data and the M2 pieces of sixth data into the eighth data transmitted at the second rate. In this way, the data processing apparatus can obtain signals of multiple transmission rates without changing an LC, helping to reduce development and maintenance costs.

Embodiment 2

Figure 3A:
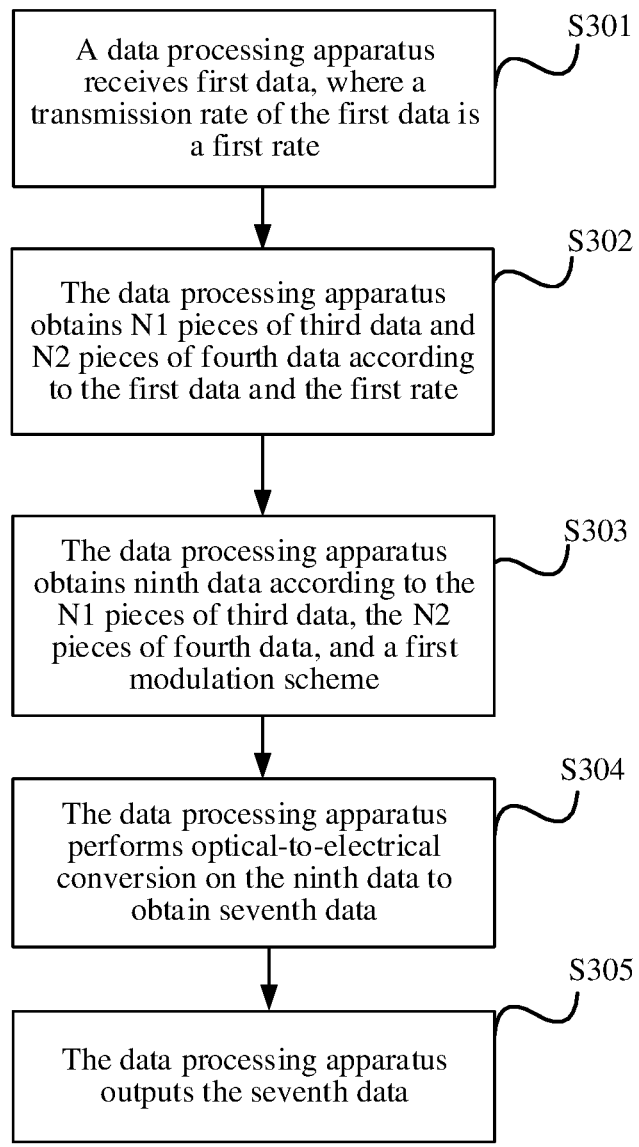
FIG. 3A is a flowchart of a method for processing data of multiple rates according to Embodiment 2 of this application.
Figure 3B:
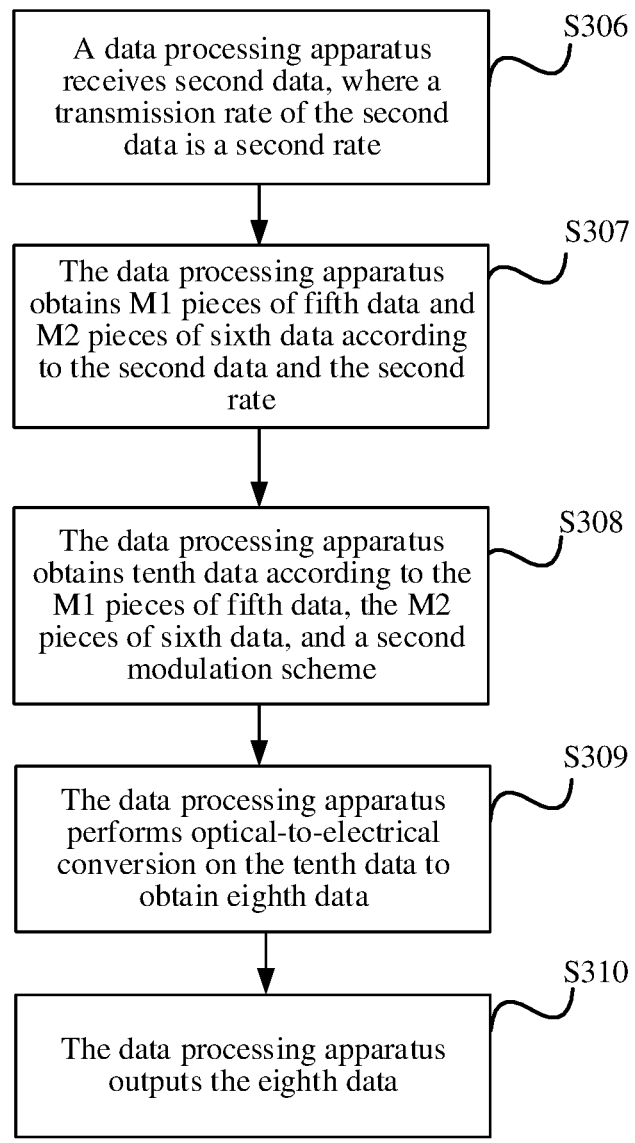
FIG. 3B is a flowchart of a method for processing data of multiple rates according to Embodiment 2 of this application.

FIG. 3A shows a process of processing, by a data processing apparatus, first data. FIG. 3B shows a process of processing, by the data processing apparatus, second data. The data processing apparatus may process the first data and the second data at the same time, or may process the first data and the second data in order. An order of processing the first data and the second data is not limited herein.

As shown in FIG. 3A, a method for processing data of multiple rates provided in Embodiment 2 of this application includes steps S301 to S305. As shown in FIG. 3B, the method for processing data of multiple rates provided in Embodiment 2 of this application includes step S306 to S310.

Step S301. The data processing apparatus receives first data, where a transmission rate of the first data is a first rate.

Step S302. The data processing apparatus obtains N1 pieces of third data and N2 pieces of fourth data according to the first rate and the first data, where N1 is an integer greater than or equal to 1, and N2 is an integer greater than or equal to 0.

Step S303. The data processing apparatus obtains ninth data according to the N1 pieces of third data, the N2 pieces of fourth data, and a first modulation scheme, where a transmission rate of the ninth data is the first rate.

Step S304. The data processing apparatus performs optical-to-electrical conversion on the ninth data to obtain seventh data, where the seventh data is serial data and the seventh data is an optical signal.

Step S305. The data processing apparatus outputs the seventh data.

Step S306. The data processing apparatus receives second data, where a transmission rate of the second data is a second rate.

Step S307. The data processing apparatus obtains M1 pieces of fifth data and M2 pieces of sixth data according to the second rate and the second data, where M1 is an integer greater than or equal to 1, and M2 is an integer greater than or equal to 0.

Step S308. The data processing apparatus obtains tenth data according to the M1 pieces of fifth data, the M2 pieces of sixth data, and a second modulation scheme, where a transmission rate of the tenth data is the second rate.

Step S309. The data processing apparatus performs optical-to-electrical conversion on the tenth data to obtain eighth data, where the eighth data is serial data and the eighth data is an optical signal.

Step S310. The data processing apparatus outputs the eighth data.

In this embodiment of this application, "first" in the first data and "second" in the second data do not represent an order of the data, and "first" and "second" are used to indicate that the first data and the second data are different data. That is, S301 may be performed before or after step S306, or step S301 and step S306 may be performed at the same time.

For example, the data processing apparatus may receive the first data and the second data at the same time, or may receive the first data and the second data chronologically. A port for receiving, by the data processing apparatus, the first data and a port for receiving, by the data processing apparatus, the second data may be a same port, or may be different ports. If the data processing apparatus receives the first data and the second data at the same time, the port for receiving, by the data processing apparatus, the first data and the port for receiving, by the data processing apparatus, the second data are different.

In a possible implementation, if the port for receiving, by the data processing apparatus, the first data and the port for receiving, by the data processing apparatus, the second data are different, the data processing apparatus may store a correspondence between a port and a rate. For example, a first correspondence includes the first rate and the port for receiving the first data, and a second correspondence includes the second rate and the port for receiving the second data.

Optionally, between steps S301 and S302, the method provided in Embodiment 2 of this application further includes determining, by the data processing apparatus, the first rate according to the port for receiving the first data. For example, the data processing apparatus may obtain the first rate according to the first correspondence and the port for receiving the first data.

Optionally, between steps S306 and S307, the method provided in Embodiment 2 of this application further includes determining, by the data processing apparatus, the second rate according to the port for receiving the second data. For example, the data processing apparatus may obtain the second rate according to the second correspondence and the port for receiving the second data.

In another possible implementation, the data processing apparatus may determine a rate of received data according to a bandwidth needed by an optical signal transmitted using a fiber.

Optionally, the method provided in Embodiment 2 of this application further includes determining, by the data processing apparatus, the first rate according to the bandwidth needed by the seventh data. For example, the data processing apparatus may determine the first rate by reading the bandwidth needed by the seventh data, before step S301, simultaneously with step S301, or after step S301 and before step S302.

Optionally, the method provided in Embodiment 2 of this application further includes determining, by the data processing apparatus, the second rate according to the bandwidth needed by the eighth data. For example, the data processing apparatus may determine the second rate by reading the bandwidth needed by the eighth data, before step S306, simultaneously with step S306, or after step S306 and before step S307.

A specific implementation of S302 may use a specific implementation of step S202 in Embodiment 1. This is not described herein using an example. A specific implementation of step S307 may use a specific implementation of step S206 in Embodiment 1. This is not described herein using an example.

A specific implementation of obtaining the ninth data in step S303 may use a specific implementation of obtaining the seventh data in Embodiment 1 in step S203 in Embodiment 1. This is not described herein using an example. A specific implementation of obtaining the tenth data in step S308 may use a specific implementation of obtaining the eighth data in Embodiment 1 in step S207 in Embodiment 1. This is not described herein using an example.

For example, in step S304, the data processing apparatus loads the ninth data onto an optical carrier, and obtains the seventh data.

For example, in step S309, the data processing apparatus loads the tenth data onto an optical carrier, and obtains the eighth data.

For example, in step S305, the data processing apparatus outputs the seventh data to a fiber.

For example, in step S310, the data processing apparatus outputs the eighth data to a fiber.

In the method provided in this embodiment of this application, the data processing apparatus can split the first data transmitted at the first rate into multiple pieces of data, for example, the N1 pieces of third data and the N2 pieces of fourth data, and modulate and perform optical-to-electrical conversion on the multiple pieces of data, to obtain the seventh data transmitted at the first rate. The data processing apparatus splits the second data transmitted at the second rate into the M1 pieces of fifth data and the M2 pieces of sixth data without changing hardware or an interface, and modulates and performs optical-to-electrical conversion on the M1 pieces of fifth data and the M2 pieces of sixth data into the eighth data transmitted at the second rate. In this way, the data processing apparatus can obtain signals of multiple transmission rates without changing an LC, helping to reduce development and maintenance costs.

Embodiment 3

Figure 4:
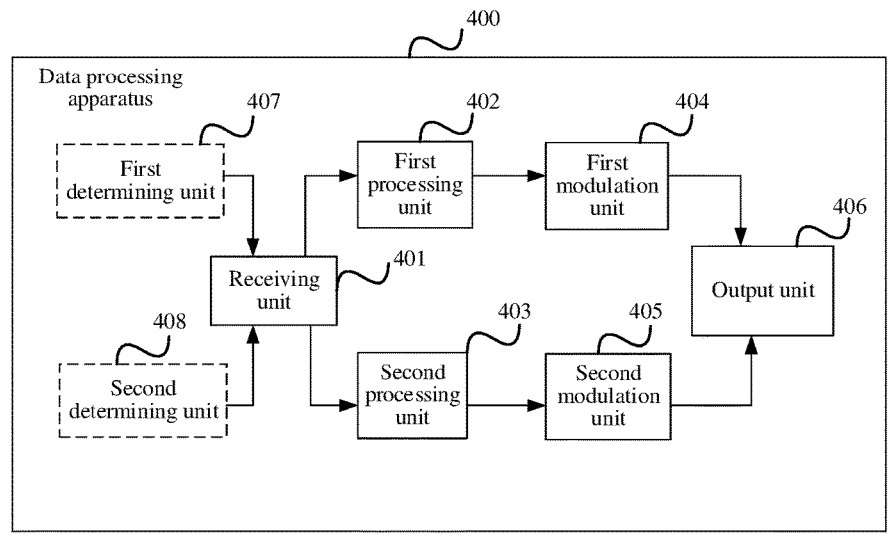
FIG. 4 is a schematic structural diagram of a data processing apparatus according to Embodiment 3 of this application.

FIG. 4 is a schematic structural diagram of a data processing apparatus 400 according to Embodiment 3 of this application. As shown in FIG. 4, the data processing apparatus 400 includes a receiving unit 401, a first processing unit 402, a second processing unit 403, a first modulation unit 404, a second modulation unit 405, and an output unit 406. The data processing apparatus 400 may perform the method provided in the embodiment corresponding to FIG. 2A, FIG. 2B, FIG. 3A, or FIG. 3B.

The receiving unit 401 is configured to receive first data and second data, where a transmission rate of the first data is a first rate, a transmission rate of the second data is a second rate, and the first rate is different from the second rate.

The first processing unit 402 is configured to obtain N1 pieces of third data and N2 pieces of fourth data according to the first data received by the receiving unit 401 and the first rate, where N1 is an integer greater than or equal to 1, and N2 is an integer greater than or equal to 0.

The second processing unit 403 is configured to obtain M1 pieces of fifth data and M2 pieces of sixth data according to the second data received by the receiving unit 401 and the second rate, where M1 is an integer greater than or equal to 1, and M2 is an integer greater than or equal to 0.

The first modulation unit 404 is configured to obtain seventh data according to the N1 pieces of third data and the N2 pieces of fourth data that are obtained by the first processing unit 402, and a first modulation scheme, where the seventh data is serially transmitted data, and a transmission rate of the seventh data is the first rate.

The second modulation unit 405 is configured to obtain eighth data according to the M1 pieces of fifth data and the M2 pieces of sixth data that are obtained by the second processing unit 403, and a second modulation scheme, where the eighth data is serially transmitted data, and a transmission rate of the eighth data is the second rate.

The output unit 406 is configured to output the seventh data obtained by the first modulation unit 404 and the eighth data obtained by the second modulation unit 405.

For example, if N1 is equal to 1, and N2 is equal to 0, the first modulation unit 404 is further configured to use the third data as the seventh data, where the first modulation scheme is transparently transmitting the third data.

For example, if M1 is equal to 1, and M2 is equal to 0, the second modulation unit 405 is further configured to use the fifth data as the eighth data, where the second modulation scheme is transparently transmitting the fifth data.

For example, the first modulation unit 404 is further configured to modulate the N1 pieces of third data and the N2 pieces of fourth data that are obtained by the first processing unit 402 into ninth data according to the first modulation scheme, where a rate of the ninth data is the first rate, and perform optical-to-electrical conversion on the ninth data, to obtain the seventh data, where the seventh data is an optical signal.

For example, the second modulation unit 405 is further configured to modulate the M1 pieces of fifth data and the M2 pieces of sixth data that are obtained by the second processing unit 403 into tenth data according to the second modulation scheme, where a rate of the tenth data is the second rate, and perform optical-to-electrical conversion on the tenth data, to obtain the eighth data, where the eighth data is an optical signal.

Optionally, the data processing apparatus 400 further includes a first determining unit 407 and a second determining unit 408.

For example, in an implementation, the first determining unit 407 is configured to determine the first rate according to a port for receiving the first data, where the port for receiving the first data corresponds to the first rate. The second determining unit 408 is configured to determine the second rate according to a port for receiving the second data, where the port for receiving the second data corresponds to the second rate.

For example, in another implementation, the first determining unit 407 is configured to determine the first rate according to a bandwidth needed for transmitting a first optical signal, where the first optical signal is a signal obtained after optical-to-electrical conversion is performed on the seventh data, and the second determining unit 408 is configured to determine the second rate according to a bandwidth needed for transmitting a second optical signal, where the second optical signal is a signal obtained after optical-to-electrical conversion is performed on the eighth data.

In the data processing apparatus 400 provided in this embodiment of this application, the first processing unit 402 can split the first data transmitted at the first rate into multiple pieces of data, for example, the N1 pieces of third data and the N2 pieces of fourth data. The first modulation unit 404 modulates the multiple pieces of data to obtain the seventh data transmitted at the first rate. The data processing apparatus 400 processes the second data transmitted at the second rate, without changing hardware or an interface. That is, the second processing unit 403 splits the second data transmitted at the second rate into the M1 pieces of fifth data and the M2 pieces of sixth data. The second modulation unit 405 modulates the M1 pieces of fifth data and the M2 pieces of sixth data into the eighth data transmitted at the second rate. In this way, the data processing apparatus 400 can obtain signals of multiple transmission rates without changing an LC, helping to reduce development and maintenance costs.

Embodiment 4

Figure 5:
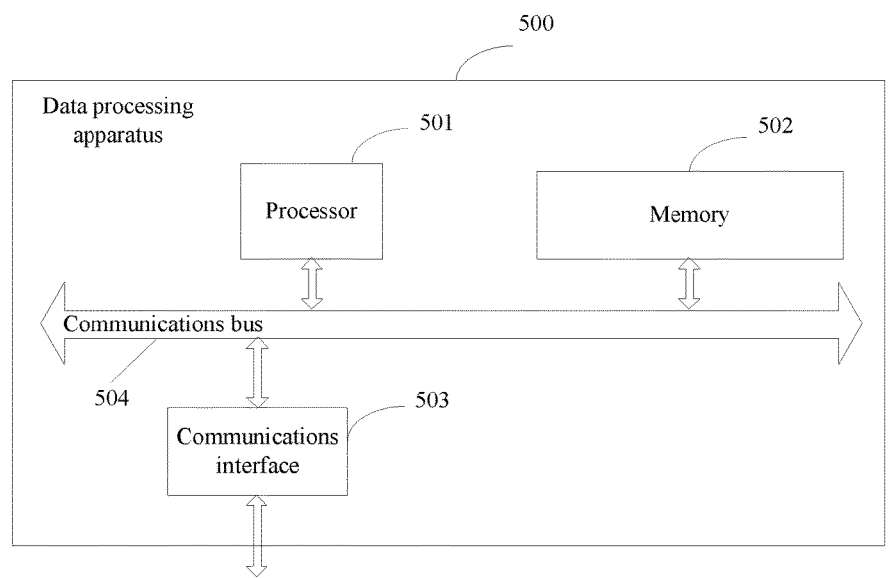
FIG. 5 is a schematic structural diagram of a data processing apparatus according to Embodiment 4 of this application.

FIG. 5 is a schematic structural diagram of a data processing apparatus 500 according to Embodiment 4 of this application. As shown in FIG. 5, the data processing apparatus 500 includes a processor 501, a memory 502, and a communications interface 503. The processor 501, the memory 502, and the communications interface 503 are connected using a communications bus 504.

The memory 502 is configured to store a program.

The processor 501 is configured to perform the following operations according to an executable instruction included in the program read from the memory 502.

The processor 501 is configured to receive first data and second data using the communications interface 503, where a transmission rate of the first data is a first rate, a transmission rate of the second data is a second rate, and the first rate is different from the second rate.

The processor 501 is configured to obtain N1 pieces of third data and N2 pieces of fourth data according to the first rate and the first data, where N1 is an integer greater than or equal to 1, and N2 is an integer greater than or equal to 0.

The processor 501 is configured to obtain M1 pieces of fifth data and M2 pieces of sixth data according to the second rate and the second data, where M1 is an integer greater than or equal to 1, and M2 is an integer greater than or equal to 0.

The processor 501 is configured to obtain seventh data according to the N1 pieces of third data, the N2 pieces of fourth data, and a first modulation scheme, where the seventh data is serially transmitted data, and a transmission rate of the seventh data is the first rate.

The processor 501 is configured to obtain eighth data according to the M1 pieces of fifth data, the M2 pieces of sixth data, and a second modulation scheme, where the eighth data is serially transmitted data, and a transmission rate of the eighth data is the second rate.

The processor 501 is configured to output the seventh data and the eighth data using the communications interface 503.

Further, the processor 501 cooperates with the communications interface 503 according to the executable instruction in the memory 502 such that the data processing apparatus 500 shown in FIG. 5 performs operations performed by the data processing apparatus in Embodiment 1 or Embodiment 2.

The data processing apparatus 500 shown in FIG. 5 and the data processing apparatus 400 shown in FIG. 4 may be a same apparatus, for example, both are the data processing apparatus in Embodiment 1 or Embodiment 2. It may be considered that FIG. 5 shows, from the physical perspective, content included in a data processing apparatus, and FIG. 4 shows, from the logical perspective, content included in a data processing apparatus. Optionally, the receiving unit 401 and the output unit 407 shown in FIG. 4 may be implemented using the communications interface 503 in FIG. 5, and the communications interface 503 may include at least one physical interface. The first processing unit 402, the second processing unit 403, the first modulation unit 404, the second modulation unit 405, the first determining unit 407, and the second determining unit 408 shown in FIG. 4 may be implemented by the processor 501 shown in FIG. 5 according to the executable instruction stored in the memory 502. The processor 501 may include at least one physical processor.

In the data processing apparatus 500 provided in this embodiment of this application, the processor 501 can split the first data transmitted at the first rate into multiple pieces of data, for example, the N1 pieces of third data and the N2 pieces of fourth data. The processor 501 modulates the multiple pieces of data to obtain the seventh data transmitted at the first rate. The data processing apparatus 500 processes the second data transmitted at the second rate, without changing hardware or an interface. That is, the processor 501 splits the second data transmitted at the second rate into the M1 pieces of fifth data and the M2 pieces of sixth data. The processor 501 modulates the M1 pieces of fifth data and the M2 pieces of sixth data into the eighth data transmitted at the second rate. In this way, the data processing apparatus 500 can obtain signals of multiple transmission rates without changing an LC, helping to reduce development and maintenance costs.

Embodiment 5

Figure 6:
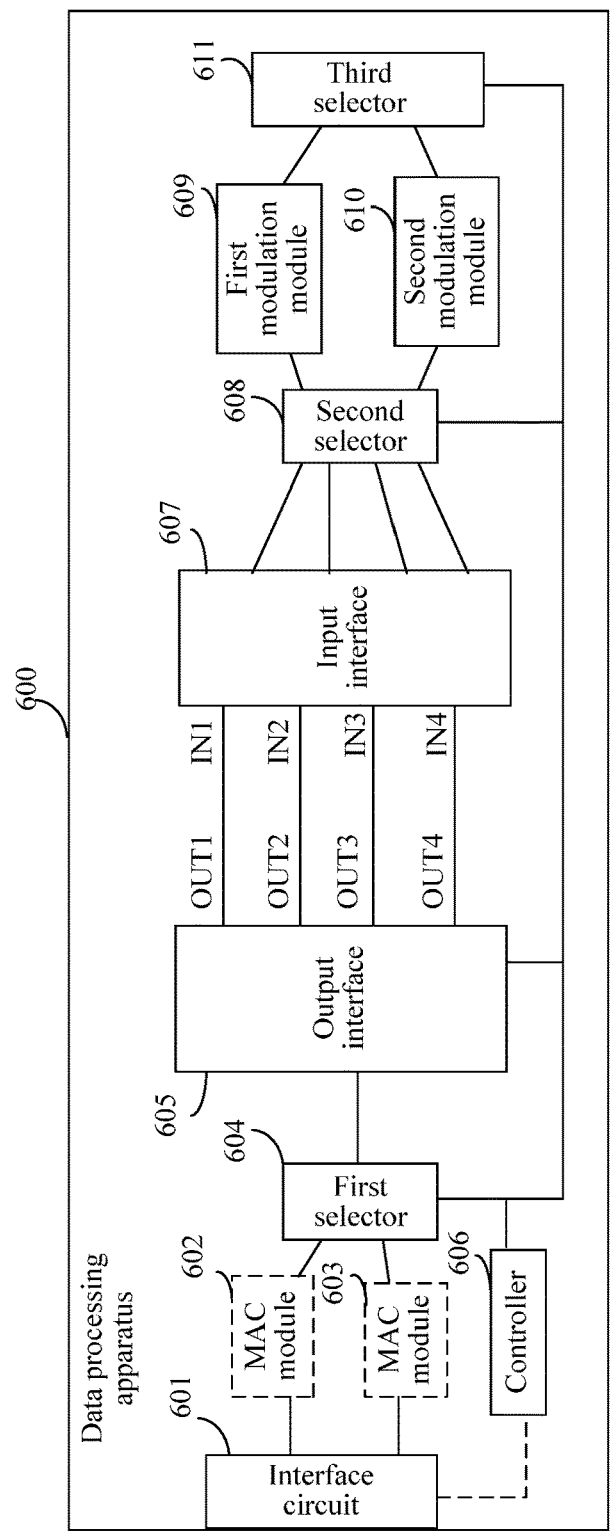
FIG. 6 is a schematic structural diagram of a data processing apparatus according to Embodiment 5 of this application.

FIG. 6 is a schematic structural diagram of a data processing apparatus 600 according to Embodiment 5 of this application.

The data processing apparatus 600 includes an interface circuit 601, a first selector 604, an output interface 605, a controller 606, an input interface 607, a second selector 608, a first modulation module 609, a second modulation module 610, and a third selector 611. Optionally, the data processing apparatus 600 further includes a MAC module 602 and a MAC module 603.

The interface circuit 601, the MAC module 602, the MAC module 603, the first selector 604, the output interface 605, and the controller 606 may be integrated into a first chip (not shown in FIG. 6). The input interface 607, the second selector 608, the first modulation module 609, the second modulation module 610, and the third selector 611 may be integrated into a second chip (not shown in FIG. 6).

The data processing apparatus 600 may be the data processing apparatus in Embodiment 1 or Embodiment 3. The interface circuit 601 may implement functions of the receiving unit 401. The first selector 604 and the output interface 605 may implement functions of the first processing unit 402, and may further implement functions of the second processing unit 403. The input interface 607, the second selector 608, and the first modulation module 609 may implement functions of the first modulation unit 404. The input interface 607, the second selector 608, and the second modulation module 610 may implement functions of the second modulation unit. The third selector 611 may implement functions of the output unit 406. Optionally, the controller 606 may implement functions of the first determining unit 407, and may further implement functions of the second determining unit 408.

The following describes a working principle of the data processing apparatus 600 using an example in which the data processing apparatus 600 receives first data, a first rate of the first data is 10 Gbit/s, the data processing apparatus 600 receives second data, and a second rate of the second data is 40 Gbit/s.

In the data processing apparatus 600, an output end of the interface circuit 601 includes different ports, for example, includes a first port and a second port. The first port is configured to receive the first data, and the second port is configured to receive the second data. The first port may transmit data to the first selector 604. The second port may transmit data to the first selector 604.

Optionally, if the first chip further includes the MAC module 602 and the MAC module 603, the first port and the first selector 604 are connected using the MAC module 602, the MAC module 602 is configured to perform MAC encapsulation on the first data, the second port and the first selector 604 are connected using the MAC module 603, and the MAC module 603 is configured to perform MAC encapsulation on the second data.

The output interface 605 may be implemented using a SerDes interface, and the first selector 604 may transmit data to a parallel input interface of the output interface 605. The output interface 605 has four serial output interfaces, that is, OUT1 to OUT4 shown in FIG. 6.

In the second chip, the input interface 607 may be implemented using a SerDes interface, and the SerDes interface has four serial input interfaces, that is, IN1 to IN4. The OUT1 to the OUT4 of the output interface 605 may respectively transmit data to the IN1 to the IN4 of the input interface 607. The output interface 605 and the input interface 607 are configured to transmit data from the first chip to the second chip. The four parallel output interfaces of the input interface 607 are respectively configured to transmit data to four input ends of the second selector 608. Output ends of the second selector 608 may respectively transmit data to the first modulation module 609 and the second modulation module 610. The first modulation module 609 is configured to transparently transmit one piece of 10 Gbit/s data, and the second modulation module 610 is configured to modulate and combine four pieces of 10 Gbit/s data into one piece of 40 Gbit/s data.

The controller 606 may separately communicate with the first selector 604, the second selector 608, and the third selector 611 using a communications bus. The controller 606 may be integrated into the first chip, or the second chip, or another chip of the data processing apparatus 600. The controller 606 may include multiple control units, and the multiple control units are separately integrated into the first chip, the second chip, or another chip of the data processing apparatus 600.

The interface circuit 601 receives the first data, and the controller 606 determines that the first rate is 10 Gbit/s. For example, the first data is one piece of parallel data.

For example, the controller 606 may determine the first rate using any implementation of determining the first rate in Embodiment 1. The interface circuit 601 outputs the first data to the first selector 604. Optionally, the interface circuit 601 first outputs the first data to the MAC module 602, the MAC module 602 performs MAC encapsulation on the first data, and the MAC module 602 outputs the encapsulated first data to the first selector 604.

For example, in an example, the controller 606 obtains a port for receiving, by the interface circuit 601, the first data, and determines the first rate according to the port for receiving the first data.

For example, in another example, the controller 606 determines a rate of received data according to a bandwidth needed by an optical signal transmitted using a fiber. For example, the controller 606 reads a bandwidth of a first optical-to-electrical conversion apparatus, and obtains the first rate. The first optical-to-electrical conversion apparatus is configured to perform optical-to-electrical conversion on seventh data output by the data processing apparatus 600 to obtain a first optical signal. For example, the controller 606 reads, using a peripheral component interconnect (PCI) bus, information that is stored in a register of the first optical-to-electrical conversion apparatus and that is about the bandwidth.

For example, the first selector 604 outputs the first data to the output interface 605.

For example, the output interface 605 converts the one piece of parallel first data into one piece of serial third data according to a first instruction. The first instruction is used to instruct the output interface 605 to convert the one piece of parallel first data into the one piece of serial third data. For example, the first instruction is an instruction that is sent by the controller 606 to the output interface 605. The output interface 605 outputs the one piece of serial third data from the OUT1 to the second chip. Further, the output interface 605 inputs the one piece of third data to the second chip through the IN1 of the input interface 607.

For example, the second selector 608 outputs the one piece of third data to the first modulation module 609 according to a second instruction. The second instruction is used to instruct the second selector 608 to output the one piece of third data to the first modulation module 609. For example, the second instruction is sent by the controller 606 to the second selector 608. The first modulation module 609 transparently transmits the third data as the seventh data.

For example, the third selector 611 outputs the seventh data. In an example, if data output by an output end of the first modulation module 609 is parallel data, the output end of the third selector 611 may be connected to a SerDes interface, and the SerDes interface is used as an output interface of the data processing apparatus, converts the parallel data into serial seventh data, and outputs the seventh data. In another example, if data output by the first modulation module 609 is serial seventh data, the third selector 611 may directly output the seventh data.

The interface circuit 601 receives the second data. For example, the second data is one piece of parallel data. The controller 606 determines, using any implementation of determining the second rate in Embodiment, that the second rate is 40 Gbit/s.

For example, in an example, the controller 606 obtains a port for receiving, by the interface circuit 601, the second data, and determines the second rate according to the port for receiving the second data.

For example, in another example, the controller 606 determines a rate of received data according to a bandwidth needed by an optical signal transmitted using a fiber. For example, the controller 606 reads a bandwidth of a second optical-to-electrical conversion apparatus, and obtains the second rate. The second optical-to-electrical conversion apparatus is configured to perform optical-to-electrical conversion on eighth data output by the data processing apparatus 600 to obtain a second optical signal. For example, the controller 606 reads, using a PCI bus, information that is stored in a register of the second optical-to-electrical apparatus and that is about the bandwidth.

Further, a manner of connecting the data processing apparatus 600 to the first optical-to-electrical conversion apparatus and the second optical-to-electrical conversion apparatus may be as follows. The output end of the data processing apparatus 600 is separately connected to the first optical-to-electrical conversion apparatus and the second optical-to-electrical apparatus in different time periods. After the data processing apparatus 600 is connected to the first optical-to-electrical conversion apparatus or the second optical-to-electrical conversion apparatus, in an initialization process, the controller 606 obtains the bandwidth of the first optical-to-electrical conversion apparatus or the second optical-to-electrical conversion apparatus. The data processing apparatus 600 is connected to the first optical-to-electrical conversion apparatus, and the controller 606 determines that the rate of the first data received by the interface circuit 601 is the first rate. The data processing apparatus 600 is connected to the second optical-to-electrical conversion apparatus, and the controller 606 determines that the rate of the second data received by the interface circuit 601 is the second rate.

It should be noted that that the output end of the data processing apparatus 600 is connected to the first optical-to-electrical conversion apparatus may include an implementation in which the output end of the data processing apparatus 600 is directly connected to the first optical-to-electrical conversion apparatus, or may include that there is another element between the output end of the data processing apparatus 600 and the input end of the first optical-to-electrical conversion apparatus, the data processing apparatus 600 outputs data to the other element, and the other element outputs the data to the first optical-to-electrical conversion apparatus. That the output end of the data processing apparatus 600 is connected to the second optical-to-electrical conversion apparatus includes a same implementation.

For example, the interface circuit 601 outputs the second data to the first selector 604. Optionally, the interface circuit 601 first outputs the second data to the MAC module 603, the MAC module 603 performs MAC encapsulation on the second data, and the MAC module 603 outputs the encapsulated second data to the first selector 604.

For example, the first selector 604 outputs the second data to the output interface 605.

For example, the output interface 605 converts one piece of parallel 40 Gbit/s second data into four pieces of serial 10 Gbit/s fifth data according to a third instruction, and outputs the four pieces of fifth data respectively from the OUT1 to the OUT4 of the output interface 605. For example, the second data is 32-bit parallel data. The output interface 605 converts the first bit to the eighth bit from the most significant bit (MSB) of the 32-bit parallel data into one piece of fifth data, and outputs the one piece of fifth data from the OUT1, converts the ninth bit to the $16^{th}$ bit into another piece of fifth data, and outputs the other piece of fifth data from the OUT2, converts the $17^{th}$ bit to the $24^{th}$ bit into another piece of fifth data, and outputs the other piece of fifth data from the OUT3, and converts the $25^{th}$ bit to the $32^{nd}$ bit into the other piece of fifth data, and outputs the other piece of fifth data from the OUT4. For example, the third instruction is sent by the controller 606 to the output interface 605.

For example, the second selector 608 outputs the four pieces of fifth data to the second modulation module 610 according to a fourth instruction. The second modulation module 610 combines the four pieces of fifth data into one piece of eighth data. For example, the second modulation module 610 may obtain the one piece of eighth data using any modulation scheme in Embodiment 1.

For example, the third selector 611 outputs the eighth data. In an example, if data output by the output end of the second modulation module 610 is parallel data, the output end of the third selector 611 may be connected to a SerDes interface, and the SerDes interface is used as an output interface of the data processing apparatus 600, converts the parallel data into serial eighth data, and outputs the eighth data. In another example, if data output by the second modulation module 610 is serial eighth data, the third selector 611 may directly output the eighth data.

For example, in the data processing apparatus 600 provided in FIG. 6, the first data and the second data are received using different ports of the interface circuit 601. When the first data and the second data are received using a same port, the interface circuit 601 transmits data to the MAC module 602 or the MAC module 603 using a fourth selector (not shown in FIG. 6). The controller 606 determines that the rate of the first data is 10 Gbit/s, and configures a first instruction for the fourth selector such that the fourth selector transmits the first data to the MAC module 602. The controller 606 determines that the rate of the second data is 40 Gbit/s, and configures a second instruction for the fourth selector such that the fourth selector transmits the second data to the second MAC module 603.

For example, when the data processing apparatus 600 provided in FIG. 6 is the data processing apparatus in Embodiment 2, that is, the seventh data is an optical signal and the eighth data is an optical signal, the data processing apparatus 600 further includes an optical-to-electrical conversion module. The third selector 611 may transmit data to the optical-to-electrical conversion module, and an output end of the optical-to-electrical conversion module outputs the seventh data and the eighth data. For example, a first optical-to-electrical conversion module loads the ninth data onto an optical carrier, and obtains the seventh data. A second optical-to-electrical conversion module loads the tenth data onto an optical carrier, and obtains the eighth data. For example, the optical carrier may be generated by a light source of the optical-to-electrical conversion module. The light source may be a laser diode (LD), or a light emitting diode (LED). For example, the optical-to-electrical conversion module is a hot plugging component.

The MAC module 602, the MAC module 603, the controller 606, the first modulation module 609, and the second modulation module 610 in the data processing apparatus 600 may be implemented using a central processing unit (CPU), or may be implemented using a programmable component such as a field-programmable gate array (FPGA) or a coprocessor. Obviously, the function modules may be implemented in a manner of combining software and hardware.

The data processing apparatus 600 provided in this embodiment of this application can split the first data transmitted at the first rate into multiple pieces of data, for example, the N1 pieces of third data and the N2 pieces of fourth data. The data processing apparatus 600 modulates the multiple pieces of data to obtain the seventh data transmitted at the first rate. The data processing apparatus 600 processes the second data transmitted at the second rate, without changing hardware or an interface. That is, the data processing apparatus 600 splits the second data transmitted at the second rate into the M1 pieces of fifth data and the M2 pieces of sixth data. The data processing apparatus 600 modulates the M1 pieces of fifth data and the M2 pieces of sixth data into the eighth data transmitted at the second rate. In this way, the data processing apparatus 600 can obtain signals of multiple transmission rates without changing an LC, helping to reduce development and maintenance costs.

Embodiment 6

Figure 7:
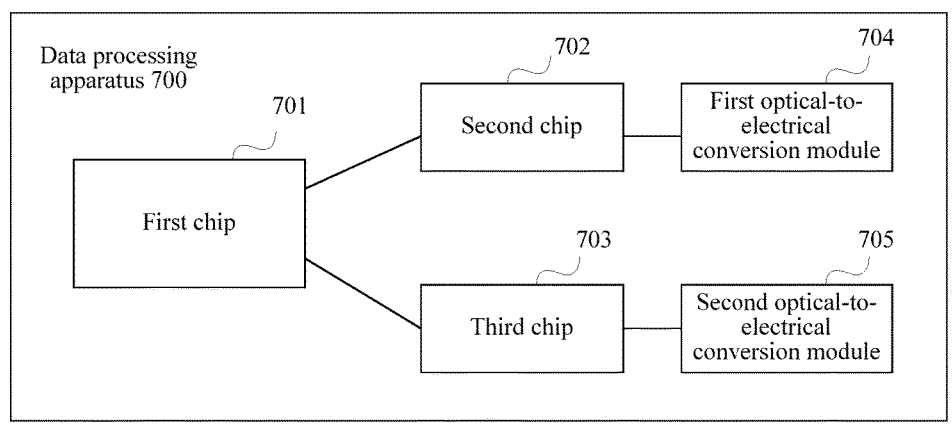
FIG. 7 is a schematic structural diagram of a data processing apparatus according to Embodiment 6 of this application.

FIG. 7 is a schematic structural diagram of a data processing apparatus 700 according to Embodiment 6 of this application.

The data processing apparatus 700 includes a first chip 701, a second chip 702, a third chip 703, a first optical-to-electrical conversion module 704, and a second optical-to-electrical conversion module 705.

The first chip 701 may include the interface circuit 601, the first selector 604, the output interface 605, and the controller 606 shown in FIG. 6. Optionally, the first chip 701 further includes the MAC module 602 and the MAC module 603 shown in FIG. 6. A difference between the first chip 701 in FIG. 7 and the first chip in Embodiment 5 lies in that the first chip 701 in FIG. 7 includes two output interfaces, for example, a first output interface and a second output interface (not shown in FIG. 7). The first output interface is configured to transmit data to the second chip 702, and the second output interface is configured to transmit data to the third chip 703. Correspondingly, the first selector in the first chip 701 has two output ends, respectively configured to transmit data to the first output interface and the second output interface.

The second chip 702 includes the input interface 607, the second selector 608, the first modulation module 609, the second modulation module 610, and the third selector 611 in FIG. 6. In the second chip 702, a manner of connecting the input interface 607, the second selector 608, the first modulation module 609, the second modulation module 610, and the third selector 611 is the same as a connection manner shown in FIG. 6.

The third chip 703 includes the input interface 607, the second selector 608, the first modulation module 609, the second modulation module 610, and the third selector 611 in FIG. 6. In the third chip 703, a manner of connecting the input interface 607, the second selector 608, the first modulation module 609, the second modulation module 610, and the third selector 611 is the same as a connection manner shown in FIG. 6.

The interface circuit in the first chip 701 includes different ports, for example, a first port and a second port. The first chip 701 receives first data from the first port and receives second data from the second port. The first data and the second data may be received at the same time, or may be received chronologically.

For example, the first chip 701 outputs the first data from the first selector to the first output interface according to a configured first instruction to transmit the data to the second chip 702 for processing. The second chip 702 obtains a serial electrical signal according to the data and a configured second instruction, and outputs the serial electrical signal to the first optical-to-electrical conversion module 704. The first optical-to-electrical conversion module 704 performs optical-to-electrical conversion on the serial electrical signal to obtain one piece of serial seventh data. The seventh data is an optical signal.

For example, the first chip 701 outputs the second data from the first selector to the second output interface according to a configured third instruction to transmit the data to the third chip 703 for processing. The third chip 703 obtains a serial electrical signal according to the data and a configured fourth instruction, and outputs the serial electrical signal to the second optical-to-electrical conversion module 705. The second optical-to-electrical conversion module 705 performs optical-to-electrical conversion on the serial electrical signal to obtain one piece of serial eighth data. The eighth data is an optical signal.

A specific implementation of processing, by the first chip 701, the second chip 702, and the third chip 703, data may be a specific implementation in Embodiment 6. A specific implementation of converting, by the first optical-to-electrical conversion module 704 and the second optical-to-electrical conversion module 705, a serial electrical signal into a serial optical signal may be a specific implementation in Embodiment 2.

Functions of the first chip 701, the second chip 702, and the third chip 703 are respectively integrated into three different chips such that a distance between the second chip 702 and the first optical-to-electrical conversion module 704 can be reduced, and quality of data transmission between the second chip 702 and the first optical-to-electrical conversion module 704 is improved, a distance between the third chip 703 and the second optical-to-electrical conversion module 705 can be reduced, and quality of data transmission between the second chip 702 and the first optical-to-electrical conversion module 704 is improved.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit. For example, a detector, a transmitter, a receiver, and an obtaining unit may be implemented using a general CPU, an application-specific integrated circuit (ASIC), or an FPGA.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure using an example, rather than limiting the present disclosure. Although the present disclosure and benefits of the present disclosure are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present disclosure.

What is claimed is:

1. A method for processing data of a plurality of rates, comprising:
   receiving, by a data processing apparatus, first data and second data, a transmission rate of the first data comprising a first rate, a transmission rate of the second data comprising a second rate, and the first rate being different from the second rate;
   obtaining, by the data processing apparatus, N1 pieces of third data and N2 pieces of fourth data according to the first rate and the first data, the N1 comprising an integer greater than or equal to one, and the N2 comprising an integer greater than or equal to zero;
   obtaining, by the data processing apparatus, M1 pieces of fifth data and M2 pieces of sixth data according to the second rate and the second data, the M1 comprising an integer greater than or equal to one, and the M2 comprising an integer greater than or equal to zero;
   obtaining, by the data processing apparatus, seventh data according to the N1 pieces of third data, the N2 pieces of fourth data, and a first modulation scheme, the seventh data being serially transmitted data, and a transmission rate of the seventh data comprising the first rate;
   obtaining, by the data processing apparatus, eighth data according to the M1 pieces of fifth data, the M2 pieces of sixth data, and a second modulation scheme, the eighth data being the serially transmitted data, and a transmission rate of the eighth data comprising the second rate; and
   outputting, by the data processing apparatus, the seventh data and the eighth data.

2. The method of claim 1, wherein when the N1 is equal to one and the N2 is equal to zero, obtaining the seventh data comprises setting, by the data processing apparatus, the third data as the seventh data, and the first modulation scheme being transparently transmitting the third data.

3. The method of claim 1, wherein when the M1 is equal to one and the M2 is equal to zero, obtaining the eighth data comprises setting, by the data processing apparatus, the fifth data as the eighth data, and the second modulation scheme being transparently transmitting the fifth data.

4. The method of claim 1, wherein obtaining the seventh data comprises:
   modulating, by the data processing apparatus, the N1 pieces of third data and the N2 pieces of fourth data into ninth data according to the first modulation scheme, a rate of the ninth data comprising the first rate; and performing, by the data processing apparatus, optical-to-electrical conversion on the ninth data to obtain the seventh data comprising an optical signal.

5. The method of claim 1, wherein obtaining the eighth data comprises:

modulating, by the data processing apparatus, the M1 pieces of fifth data and the M2 pieces of sixth data into tenth data according to the second modulation scheme, a rate of the tenth data comprising the second rate; and performing, by the data processing apparatus, optical-to-electrical conversion on the tenth data to obtain the eighth data comprising an optical signal.

6. The method of claim 1, further comprising:

determining, by the data processing apparatus, the first rate according to a port for receiving the first data corresponding to the first rate; and determining, by the data processing apparatus, the second rate according to a port for receiving the second data corresponding to the second rate.

7. The method of claim 1, further comprising:

determining, by the data processing apparatus, the first rate according to a bandwidth needed for transmitting a first optical signal, the first optical signal comprising a signal obtained after performing optical-to-electrical conversion on the seventh data; and determining, by the data processing apparatus, the second rate according to a bandwidth needed for transmitting a second optical signal, the second optical signal comprising a signal obtained after performing the optical-to-electrical conversion on the eighth data.

8. A data processing apparatus, comprising:

a non-transitory computer-readable storage medium storing programming instructions; and a processor coupled to the non-transitory computer-readable storage medium, the programming instructions causing the processor to be configured to:

receive first data and second data, a transmission rate of the first data comprising a first rate, a transmission rate of the second data comprising a second rate, and the first rate being different from the second rate;

obtain N1 pieces of third data and N2 pieces of fourth data according to the first data and the first rate, the N1 comprising an integer greater than or equal to one, and the N2 comprising an integer greater than or equal to zero;

obtain M1 pieces of fifth data and M2 pieces of sixth data according to the second data and the second rate, the M1 comprising an integer greater than or equal to one, and the M2 comprising an integer greater than or equal to zero;

obtain seventh data according to the N1 pieces of third data, the N2 pieces of fourth data, and a first modulation scheme, the seventh data being serially transmitted data, and a transmission rate of the seventh data comprising the first rate;

obtain eighth data according to the M1 pieces of fifth data, the M2 pieces of sixth data, and a second modulation scheme, the eighth data being the serially transmitted data, and a transmission rate of the eighth data comprising the second rate; and output the seventh data and the eighth data.

9. The apparatus of claim 8, wherein when the N1 is equal to one, and the N2 is equal to zero, the programming instructions further cause the processor to be configured to set the third data as the seventh data, and the first modulation scheme being transparently transmitting the third data.

10. The apparatus of claim 8, wherein when the M1 is equal to and one and the M2 is equal to zero, the programming instructions further cause the processor to be configured to set the fifth data as the eighth data, and the second modulation scheme being transparently transmitting the fifth data.

11. The apparatus of claim 8, wherein the programming instructions further cause the processor to be configured to:

modulate the N1 pieces of third data and the N2 pieces of fourth data into ninth data according to the first modulation scheme, a rate of the ninth data comprising the first rate; and perform optical-to-electrical conversion on the ninth data to obtain the seventh data comprising an optical signal.

12. The apparatus of claim 8, wherein the programming instructions further cause the processor to be configured to:

modulate the M1 pieces of fifth data and the M2 pieces of sixth data into tenth data according to the second modulation scheme, a rate of the tenth data comprising the second rate; and perform optical-to-electrical conversion on the tenth data to obtain the eighth data comprising an optical signal.

13. The apparatus of claim 8, wherein the programming instructions further cause the processor to be configured to:

determine the first rate according to a port for receiving the first data corresponding to the first rate; and determine the second rate according to a port for receiving the second data corresponding to the second rate.

14. The apparatus of claim 8, wherein the programming instructions further cause the processor to be configured to:

determine the first rate according to a bandwidth needed for transmitting a first optical signal, the first optical signal comprising a signal obtained after performing optical-to-electrical conversion on the seventh data; and determine the second rate according to a bandwidth needed for transmitting a second optical signal, the second optical signal comprising a signal obtained after performing the optical-to-electrical conversion on the eighth data.

15. A computer program product comprising a non-transitory computer readable storage medium storing program code thereon for processing data of a plurality of rates, the program code comprising instructions for executing a method that comprises:

receiving first data and second data, a transmission rate of the first data comprising a first rate, a transmission rate of the second data comprising a second rate, and the first rate being different from the second rate;

obtaining N1 pieces of third data and N2 pieces of fourth data according to the first rate and the first data, the N1 comprising an integer greater than or equal to one, and the N2 comprising an integer greater than or equal to zero;

obtaining M1 pieces of fifth data and M2 pieces of sixth data according to the second rate and the second data, the M1 comprising an integer greater than or equal to one, and the M2 comprising an integer greater than or equal to zero;

obtaining seventh data according to the N1 pieces of third data, the N2 pieces of fourth data, and a first modulation scheme, the seventh data being serially transmitted data, and a transmission rate of the seventh data comprising the first rate;

obtaining eighth data according to the M1 pieces of fifth data, the M2 pieces of sixth data, and a second modulation scheme, the eighth data being the serially transmitted data, and a transmission rate of the eighth data comprising the second rate; and outputting the seventh data and the eighth data.

16. The computer program product of claim 15, wherein when the N1 is equal to one and the N2 is equal to zero, obtaining the seventh data comprises setting the third data as the seventh data, and the first modulation scheme being transparently transmitting the third data.

17. The computer program product of claim 1, wherein when the M1 is equal to one and the M2 is equal to zero, obtaining the eighth data comprises setting the fifth data as the eighth data, and the second modulation scheme being transparently transmitting the fifth data.

18. The computer program product of claim 15, wherein obtaining the seventh data comprises:

modulating the N1 pieces of third data and the N2 pieces of fourth data into ninth data according to the first modulation scheme, a rate of the ninth data comprising the first rate; and performing optical-to-electrical conversion on the ninth data to obtain the seventh data comprising an optical signal, and obtaining the eighth data comprises:

modulating the M1 pieces of fifth data and the M2 pieces of sixth data into tenth data according to the second modulation scheme, a rate of the tenth data comprising the second rate; and performing the optical-to-electrical conversion on the tenth data to obtain the eighth data comprising another optical signal.

19. The computer program product of claim 15, further comprising:

determining the first rate according to a port for receiving the first data corresponding to the first rate; and determining the second rate according to a port for receiving the second data corresponding to the second rate.

20. The computer program product of claim 15, further comprising:

determining the first rate according to a bandwidth needed for transmitting a first optical signal, the first optical signal comprising a signal obtained after performing optical-to-electrical conversion on the seventh data; and determining the second rate according to a bandwidth needed for transmitting a second optical signal, the second optical signal comprising a signal obtained after performing the optical-to-electrical conversion on the eighth data.

* * * * *